(12) United States Patent
Breen Carmichael et al.

(10) Patent No.: US 7,862,860 B2
(45) Date of Patent: Jan. 4, 2011

(54) MATERIALS AND METHODS FOR IMMOBILIZATION OF CATALYSTS ON SURFACES AND FOR SELECTIVE ELECTROLESS METALLIZATION

(75) Inventors: Tricia Breen Carmichael, Windsor (CA); Sarah Jane Vella, Tecumseh (CA); Ali Afzali-Ardakani, Yorktown Heights, NY (US); Mahmoud Mostafa Khojasteh, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1190 days.

(21) Appl. No.: 11/438,248

(22) Filed: May 22, 2006

(65) Prior Publication Data
US 2006/0263580 A1 Nov. 23, 2006

Related U.S. Application Data

(63) Continuation-in-part of application No. 09/998,007, filed on Nov. 29, 2001, now Pat. No. 7,087,267.

(51) Int. Cl.
*B05D 3/04* (2006.01)
*C23C 18/31* (2006.01)
*B32B 3/00* (2006.01)

(52) U.S. Cl. ............... 427/304; 427/301; 106/1.11; 428/209; 428/344; 428/355 R

(58) Field of Classification Search ........... 428/209, 428/344, 355 R; 427/301, 304; 106/1.11
See application file for complete search history.

(56) References Cited

U.S. PATENT DOCUMENTS

| | | | |
|---|---|---|---|
| 3,629,922 A | 12/1971 | Miller et al. | 428/626 |
| 3,873,359 A | 3/1975 | Lando | 117/212 |
| 3,873,360 A | 3/1975 | Lando | 117/212 |
| 3,900,614 A | 8/1975 | Lando | 427/455 |
| 4,192,764 A | 3/1980 | Madsen | 430/455 |
| 4,322,457 A | 3/1982 | Baron et al. | 427/259 |
| 4,472,458 A | 9/1984 | Sirinyan et al. | 427/92 |
| 4,701,351 A * | 10/1987 | Jackson | 430/315 |
| 5,389,496 A | 2/1995 | Calvert et al. | 430/315 |

(Continued)

*Primary Examiner*—Cathy Lam
(74) *Attorney, Agent, or Firm*—Ohlandt, Greeley, Ruggiero & Perle, LLP; Daniel P. Morris

(57) ABSTRACT

A method of immobilizing a catalyst on a substrate surface involves providing novel ligating copolymers comprising functional groups capable of binding to a substrate surface and functional groups capable of ligating to catalysts such as metal ions, metal complexes, nanoparticles, or colloids; applying the ligating copolymer to a substrate surface to cause the ligating copolymer to bind thereto, and contacting the modified substrate surface with a solution of a catalyst, causing the catalyst to be ligated by the ligating copolymer and thus immobilized on the substrate surface. The ligating copolymer may be patterned on the substrate surface using a method such as microcontact printing. A method of selectively metallizing a substrate in a desired pattern involves using a ligating chemical agent comprising functional groups capable of binding to a substrate surface and functional groups capable of ligating to electroless plating catalysts; applying the ligating chemical agent to a substrate in a desired pattern using microcontact printing to cause the ligating chemical agent to bind thereto; contacting the modified substrate surface with a solution of an electroless plating catalyst, causing the catalyst to be ligated by the ligating chemical agent and thus bound to the surface; and metallizing the catalyzed regions of the substrate surface using electroless plating.

2 Claims, 6 Drawing Sheets

U.S. PATENT DOCUMENTS

| | | | |
|---|---|---|---|
| 5,510,216 A | 4/1996 | Calabrese et al. | 430/16 |
| 5,648,201 A | 7/1997 | Dulcey et al. | 430/324 |
| 6,060,121 A | 5/2000 | Hidber et al. | 427/261 |
| 6,153,359 A | 11/2000 | Shimizu et al. | 252/79.1 |
| 6,183,545 B1 | 2/2001 | Okuhama et al. | 106/1.18 |
| 7,087,267 B2 * | 8/2006 | Breen et al. | 427/304 |

* cited by examiner

US 7,862,860 B2

MATERIALS AND METHODS FOR IMMOBILIZATION OF CATALYSTS ON SURFACES AND FOR SELECTIVE ELECTROLESS METALLIZATION

RELATED APPLICATION

This application is a continuation-in-part of U.S. patent application Ser. No. 09/998,007, filed on Nov. 29, 2001 now U.S. Pat. No. 7,087,267, the entire disclosure of which is incorporated by reference herein.

BACKGROUND OF THE INVENTION

1. Field of the Invention

The present invention relates generally to the binding of catalysts to solid supports and to functional polymeric materials, and to the derivatization and patterning of surfaces and processes and compositions for electroless metallization and related articles of manufacture. More particularly, the invention relates to the derivatization of surfaces using ligating chemical agents comprised of polymers capable of both bonding to a substrate and ligating with metal ions, metal complexes, nanoparticles or colloids for use in catalytic reactions. The present invention also relates to the use and patterning of ligating chemical agents and selective electroless plating through the use of such ligating agents, and derivative articles produced thereby.

2. Description of the Prior Art

It is often a goal, in areas such as organic and inorganic chemical catalysis, electronics and microelectronics, and electrochemistry, to efficiently bind to surfaces chemical activating agents, such as metal complexes, metal colloids, metal ions, and metal nanoparticles. In the field of microelectronic devices, sensors, optical elements and electronic displays, and the like, the development of inexpensive and convenient methods of fabrication is important. Of particular interest is the development of inexpensive and convenient methods to fabricate metal circuitry, which is found in each of the aforementioned applications.

In organic and inorganic chemical catalysis, it is desirable to recover catalysts from reaction products in an economically and environmentally sound manner. In conventional practice, catalysts have principally been applied in homogeneous form, in solution in an organic reactant phase. As such, their use has suffered from the difficulties inherent in the recovery of homogeneous catalysts from the reaction products. The recovery of catalyst from the reaction products is a relatively expensive operation and greatly increases the cost of the process. One approach is to immobilize the metal catalyst on a solid support; such a strategy is being investigated for use in organic chemical reactions, for example acylations, alkylations, enolate additions, Wittig reactions, Heck reactions, reductions, oxidations, etc., that are traditionally carried out in homogeneous solution.

One approach to catalyst immobilization for organic chemical catalysis involves coordinating a metal catalyst to a polymeric substrate. An early contribution in this direction was made by Grubbs et al. as reported in *J. Am. Chem. Soc.* 93, 3062 (1971). These authors chloromethylated slightly crosslinked polystyrene and reacted the resulting chlorine-containing polymer with lithium diphenylphosphide to produce a ligand-substituted polystyrene. Combination of the modified polymer with Wilkinson's catalyst (tris(triphenylphosphine)rhodium chloride), by coordination, produced an active, readily isolated, heterogeneous catalyst. Utility as a hydrogenation catalyst was demonstrated.

U.S. Pat. No. 3,652,678 to Allum et al. and U.S. Pat. No. 3,987,009 to Young disclose similar heterogeneous catalysts employing various insolubilizing polymers.

U.S. Pat. No. 3,998,887 to Allen discloses catalysts of similar type which comprised a polymer derived from p-styryldiethylphosphine.

U.S. Pat. No. 4,045,493 to Trevillyan discloses such catalysts comprising a polyphenylene polymer backbone and pendant diphenylphosphine ligand groups.

British Pat. No. 1,517,552 discloses a process for preparing other catalysts insolubilized by covalent attachment to various polymers. The catalysts of this patent are characterized by diphosphine bidentate ligands.

Chernyshov et al. in *Chem. Mater.* 12, 114 (2000) describe the immobilization of palladium species using block copolymers comprising polystyrene and poly-m-vinyltriphenylphosphine. These copolymers were also used to immobilize palladium nanoparticles.

Bianchini et al. in *Chem. Comm.* 479 (2001) describe the immobilization of a rhodium cyclooctadiene moiety using a copolymer of a styrene-functionalized tripodal phosphine and styrene/divinylbenzene.

Chan et al. in *Chem. Mater.* 4, 24 (1992) and *J. Am. Chem. Soc.* 114, 7295 (1992) describe the immobilization of metal nanoparticles in diblock copolymers. The copolymers were synthesized from diphosphine-functionalized norbornene monomers and methyltetracyclododecene.

Other inventors have produced immobilized catalysts by attachment of monomeric ligand groups to inorganic solids. For example, U.S. Pat. No. 3,907,852 to Oswald et al. discloses a process for preparing heterogeneous rhodium catalysts comprising silylhydrocarbyl phosphine ligands attached to silica and metal oxides.

U.S. Pat. No. 3,832,404 to Allum et al. discloses a hydroformylation process employing various catalysts, among others a rhodium catalyst comprising a monodentate phosphine ligand attached to inorganic solids containing a hydroxyl group. Silica was a preferred solid. The catalysts were prepared by addition of diphenylphosphine to triethoxyvinyl silane to form an intermediate which was combined, for example, with cyclo-octadiene rhodium chloride to produce a rhodium complex. The complex was attached to silica by ester exchange.

Bianchini et al. in *Organometallics* 19, 2433 (2000) describe the immobilization of various rhodium catalysts using a sulfonate-functionalized tripodal phosphine. The sulfonate group is used to bind the ligated rhodium catalyst to silica substrates via hydrogen bonding.

The above-described methods typically are relatively time-consuming. Bifunctional molecules, such as ligand-bearing silane adhesion promoters and other molecules comprising a group to ligate to the metal catalyst and a group to bind to a substrate surface, can be difficult to synthesize; many such materials require multi-step synthesis. Silane adhesion promoters are inconvenient to work with because they must be protected from moisture to prevent self-condensation. Polymeric materials for catalyst immobilization contain functional groups, preferably phosphines, to bind to the metal catalyst, but phosphine groups typically do not bind to a substrate surface. Thus, the catalyst complex or nanoparticle can be immobilized within the phosphine-bearing polymer but is not readily attached to a solid substrate.

In the fabrication of microelectronic devices, optics, and the like, it is desirable to deposit metal pathways on a surface in an economically and environmentally sound manner. A well-known method of production of such circuitry is photolithography. According to this technique, a negative or positive resist (photoresist) is coated onto the exposed surface of a substrate. The resist is then irradiated in a predetermined pattern, and irradiated (positive resist) or nonirradiated (negative resist) portions of the resist are washed from the surface to produce a predetermined pattern of resist on the surface. This is followed by one or more procedures. For example, the resist may serve as a mask in an etching process in which areas of the material not covered by resist are chemically removed, followed by removal of resist to expose a predetermined pattern of the conducting metal on the substrate. According to another example, the patterned surface is exposed to a plating medium or to metal deposition (for example under vacuum), followed by removal of resist, resulting in a predetermined plated pattern on the surface of the material. In addition to photolithography, x-ray and electron-beam lithography have found analogous use.

Other techniques for applying metal pathways to surfaces include the well-known "silk-screening" technique, in which a paste containing finely-divided metal particles in a carrier is applied, for example, via a screen including a pattern, to a substrate in a pattern corresponding to the screen pattern. The paste is fired and a conductive metal pathway having a pattern corresponding to the screen pattern results.

Electroless deposition is a process widely used for the application of metals such as copper, nickel, gold, silver, palladium, cobalt, and others to substrates. Electroless deposition occurs by an autocatalytic redox process, in which the cation of the metal to be deposited is reduced by a soluble reductant at the surface of a catalyst used to initiate the deposition, and subsequently at the metal feature being formed. This redox process generally takes place only on catalytic surfaces, that is, surfaces that inherently are catalytic to the redox process or surfaces that first are activated with a catalyst. Low-cost methods to pattern a catalyst on a non-catalytic substrate, that is, to selectively activate a substrate in a pattern corresponding to an ultimate pattern of metal deposition, are of interest.

For electroless plating, several methods are known for binding a catalyst to a non-catalytic substrate. Many methods use ligand-bearing silane adhesion promoters, for example, U.S. Pat. No. 5,389,496 to Calvert et al.; U.S. Pat. No. 5,510,216 to Calabrese et al.; and U.S. Pat. No. 5,648,201 to Dulcey et al. describe the chemisorption of ligand-bearing silane adhesion promoters onto a surface, application to the surface of Pd(II) solution to immobilize the Pd(II) species at the ligand via coordination, and immersing the substrate in an electroless plating solution to deposit a metal.

Other methods use thin polymer layers capable of binding a catalyst, for example, U.S. Pat. No. 4,701,351 to Jackson describes binding a catalyst to a non-catalytic substrate by coating the substrate with a thin layer of a polymer having the ability to complex with a noble metal compound, such as polyamines, polyacids, and the salts of polyacids; and immersing the substrate in a solution of an electroless plating catalyst which is bound to the polymer layer.

Several methods are known for patterning a catalyst on a non-catalytic substrate. That is, selectively activating a substrate in a pattern corresponding to an ultimate pattern of metal deposition. U.S. Pat. No. 4,472,458 to Sirinyan et al. describes a process for the production of metallized semiconductors using a process involving application of catalyst across a surface, applying a polymeric material, through a mask having a pattern, to the surface, plating a metal on the surface, and dissolving the template to produce a patterned metal layer.

U.S. Pat. No. 4,322,457 to Baron et al. describes patterned metal deposition that involves applying a surfactant to a substrate in a pattern (via, for example, conventional printing techniques) applying a precursor of a catalytic agent to the surface (e.g. $Pd^{2+}$), allowing the precursor to the "buried" such that the surfactant covers the precursor in the originally-applied pattern, rinsing the surface, exposing the surface to an agent to convert the precursor to a catalyst (e.g. Pd), and plating a metal at the surface in a pattern complementary to the original pattern.

U.S. Pat. No. 4,192,764 to Madsen describes patterned metal deposition that involves coating a surface with a reducible salt of a non-noble metal and a radiation-sensitive reducing agent, irradiating the surface in a pattern to reduce the metal salt to a reduced catalyst in a pattern corresponding to the pattern of irradiation, and plating a metal at the pattern exposing the catalyst.

U.S. Pat. Nos. 3,873,359; 3,873,360; and 3,900,614 to Lando describe patterned metal deposition involving, according to a first embodiment, coating a substrate with a colloidal wetting solution capable of converting a catalyst precursor, such as palladium chloride, to a catalyst, using a stamp having a raised pattern to transfer to the surface the catalyst precursor so that the precursor reacts at the surface to form the catalyst in the pattern, and plating metal at the surface at the patterned catalytic region. According to a second embodiment, the method involves coating the surface with a catalyst precursor such as palladium chloride, using a stamp to transfer to the surface a reducing agent that converts the precursor to the catalyst in a pattern corresponding to the stamp pattern thereby reacting the precursor, in the patterned region, to produce the catalyst, and plating the metal at the surface in the pattern. According to a third embodiment, the method involves transferring to the surface, in a pattern, a reducing agent capable of reacting with a catalyst precursor to form a catalyst, exposing the surface to a catalyst precursor whereby a reaction occurs forming the catalyst in the pattern, and plating metal on the surface in the pattern.

U.S. Pat. No. 6,060,121 to Hidber et al. describes a method of transferring a colloidal catalyst to a surface involving pretreatment of a surface with a ligand-bearing silane adhesion promoter to immobilize the colloidal catalyst, then transfer of a colloidal catalyst using an elastomeric stamp as an applicator, in a microcontact printing process.

U.S. Pat. No. 5,389,496 to Calvert; U.S. Pat. No. 5,510,216 to Calabrese; and U.S. Pat. No. 5,648,201 to Dulcey describe the chemisorption of ligand-bearing organosilanes onto a surface, deep UV irradiation through a patterned mask to selectively remove the organosilane in the pattern, application to the surface of Pd(II) solution to immobilize the Pd(II) species at the regions at which the ligand remains, and electroless deposition of a metal at those regions.

The above-described methods typically are relatively time-consuming and expensive in that they involve several steps including, for example, prior to plating a metal in a pattern at the surface, carrying out a chemical reaction at the surface, to convert a precursor to a reactant needed in the plating reaction, and/or involve relatively expensive equipment such as photolithographic apparatus, and/or involve the consumption of chemical reactants and generation of corresponding chemical waste to an undesirable extent. While U.S. Pat. No. 6,060,121 to Hidber et al. avoids many of these difficulties, the process described therein requires a separate surface treatment step to cause adhesion of the plated metal film to the surface prior to patterning, and the catalysts and, more particularly, the solvents in which they are dissolved are often detrimental to the microcontact printing applicator. For example, solutions of high or low pH may damage the surface of the stamp and reduce the number of times it may be used, other solvents readily absorb into the stamp material, swelling it and thus distorting the stamp pattern. The type of catalyst used is thus critical to this process. Commercially available palladium/tin catalysts, commonly used in manufacturing, cannot easily be used.

The above-described materials for catalyst immobilization are also inconvenient to apply to a surface using microcontact printing, for example, in patterned electroless metallization. Silane adhesion promoters form crosslinked structures in solution or on the surface of a stamp used for microcontact printing. Other materials often can only be dissolved in solvents that are detrimental to the microcontact printing applicator. For example, solutions of high or low pH may damage the surface of the stamp and reduce the number of times it may be used, other solvents readily absorb into the stamp material, swelling it and thus distorting the stamp pattern.

Accordingly, a general purpose of the present invention is to provide ligating copolymers which are capable of binding to a substrate surface and capable of ligating to a metal catalyst. Another purpose of the present invention is to provide a convenient synthetic strategy for such ligating copolymers, which renders unnecessary at least some of the above-described procedural steps, time, and expense. Another purpose of the present invention is to provide a method for the immobilization of catalysts on a substrate surface. Another purpose of the present invention is to provide ligating copolymers which are soluble in solvents compatible with applicators used in microcontact printing. Another purpose of the invention is to provide a method for selective electroless metallization that uses ligating chemical agents, which are soluble in solvents compatible with applicators used in microcontact printing, and which are capable of binding to a substrate surface and capable of ligating to an electroless plating catalyst. Another general purpose of the invention is to provide a method for selective electroless metallization that allows for the use of a variety of electroless plating catalysts. Another general purpose of the invention is to provide a method of conveniently, quickly, inexpensively, and reproducibly applying to a surface such a chemical ligating agent in a manner that renders unnecessary at least some of the above-described procedural steps, reactants, waste products, time, and expense. Another purpose of the invention is to produce a variety of metal patterns on surfaces without these complications. Another purpose of the invention is to provide metal pathways on substrates that are conveniently and inexpensively manufactured.

SUMMARY OF THE INVENTION

The present invention provides ligating copolymers, which are capable of binding to a substrate surface and capable of ligating to a catalyst. The ligating copolymers have at least two functionalities: one for attracting, binding, complexing, chelating or otherwise interacting with surfaces and the other capable of ligating to a catalyst either before or after application to the surface. The latter functional group of the ligating copolymer is capable of ligating to catalysts, such as metal ions, complexes, colloids, or nanoparticles, either directly or after undergoing a desired chemical reaction at the surface.

A composition useful in applications where catalyst immobilization or ligation is utilized, comprising:

a polymer compound comprising at least one subunit with the chemical structure:

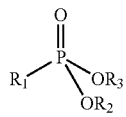

where $R_1$ is a substituted or unsubstituted alkyl group, a substituted or unsubstituted aryl group or a substituted or unsubstituted heterocyclic group and where $R_2$ and $R_3$ are hydrogen atoms; and at least one subunit with the chemical structure:

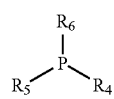

where $R_4$, $R_5$ and $R_6$ are substituted or unsubstituted alkyl groups, substituted or unsubstituted aryl groups, substituted or unsubstituted heterocyclic groups, or hydrogen atoms, and may be the same or different.

The present invention also provides a strategy for the synthesis of certain ligating copolymers. The strategy involves the copolymerization of at least two different monomers. The first monomer comprises a polymerizable functionality and phosphine moiety, which is capable of ligating to a catalyst such as a metal ion, complex, colloid or nanoparticle. The second monomer comprises a polymerizable functionality and a phosphonate acid or ester, which is capable of binding to oxide surfaces such as silicon oxide, zirconium oxide, titanium oxide, indium tin oxide, aluminum oxide, copper oxide, nickel oxide and others. Other monomers may be included to increase or decrease solubility of the copolymer, or they may comprise cross-linkable functionalities, for example, acrylate or alkyne groups. The monomers can be copolymerized to form either a random copolymer or a block copolymer.

Another object of this invention is to use ligating copolymers in applications involving the immobilization of catalysts onto substrates. According to one embodiment of the invention, a method is provided that involves the steps of:

(a) providing a polymer capable of both ligating to a catalyst and binding to the surface of a substrate;

(b) binding the polymer to the surface of the substrate; and (c) ligating the catalyst to the polymer that is bound to the surface of the substrate.

According to another embodiment of the invention, a method for immobilizing a catalyst is provided that includes the steps of:

(a) providing a polymer capable of both ligating to a catalyst and binding to a surface of a substrate;

(b) ligating the catalyst to the polymer, wherein a polymer-bound catalyst provided; and (c) binding the polymer-bound catalyst to the surface of the substrate.

The present invention also provides a novel, convenient, rapid, and relatively inexpensive method for selective deposition of metallic films over substrates using certain ligating chemical agents, generally reducing the number of steps and reactions needed in a particular application. The present invention also provides the selection of suitable ligating chemical agents, which are capable of binding to a substrate surface and capable of ligating to an electroless plating catalyst. According to another embodiment, a method is provided that involves the steps of:

(a) patterning a ligating chemical agent onto a surface of a substrate;

(b) ligating an electroless metal plating catalyst to the ligating chemical agent; and (c) exposing the catalyst to an electroless metal plating solution to thereby form a metallic film on the substrate.

The present invention also provides for the selection of ligating chemical agents capable of binding to a substrate surface and capable of ligating to an electroless plating catalyst. The ligating chemical agents have at least two functionalities: one for attracting, binding, complexing, chelating or otherwise interacting with surfaces and the other capable of chemical transformation after application to the surface. The latter functional group of the ligating chemical agent is capable of ligating to electroless plating catalysts, either directly or after undergoing a desired chemical reaction at the surface. Suitable ligating chemical agents include random copolymers, block copolymers, bifunctional molecules, and combinations thereof.

The present invention also provides a method of rendering a surface catalytic to electroless metal deposition. The method includes the steps of:

(a) depositing a ligating chemical agent on the substrate, which is capable of both binding to the substrate and ligating to an electroless plating catalyst; and (b) ligating the electroless plating catalyst to the ligating chemical agent.

The ligating chemical agent has the chemical structure:

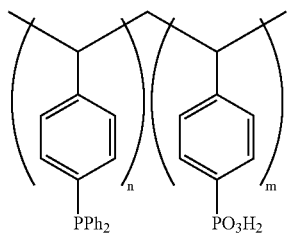

The n and the m in the chemical structure are each between about 1 and about 100.

The electroless plating catalyst is bound to the surface by ligating to the ligating chemical agent. Another method provided by the present invention includes the steps of:

(a) depositing a ligating chemical agent on the substrate, which is capable of both binding to the substrate and ligating to an electroless plating catalyst;

(b) contacting the ligating chemical agent with a chemical reagent capable of reacting with functional groups of the ligating chemical agent in a desired reaction; and (c) ligating an electroless plating catalyst to the ligating chemical agent.

The ligating chemical agent has the chemical structure:

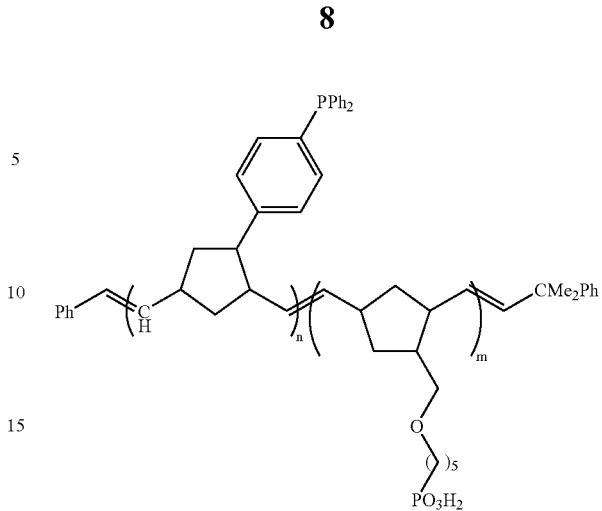

The n and the m in the chemical structure are each between about 1 and about 100.

The present invention also provides a method of patterning a substrate. The method includes the steps of:

(a) providing a substrate having a surface with hydroxyl groups;

(b) providing an applicator having a surface with at least one indentation;

(c) coating the applicator surface with a ligating chemical agent;

(d) positioning the coated applicator on substrate such that at least a portion of the substrate has the ligating chemical agent bound thereto;

(e) removing the applicator from the substrate, wherein a patterned film of the ligating chemical agent remains on the substrate;

(f) ligating an electroless plating catalyst to the ligating chemical agent, thereby forming a catalyzed substrate; and (g) depositing metal on the catalyzed substrate, thereby forming a metal deposit in a predetermined pattern.

The present invention also provides a method that involves applying essentially instantaneously to one region of a substrate surface a ligating chemical agent capable of binding to a substrate surface and capable of ligating to an electroless plating catalyst, while leaving another region of the surface, contiguous with the first region, free of ligating chemical agent. Then, the substrate surface is contacted with a solution of an electroless plating catalyst, which is bound to the surface by ligating to the ligating chemical agent. Then, metal is deposited at the first region of the surface via a reaction involving the bound electroless plating catalyst.

Some or all of the above-noted methods of the invention can be combined according to a further method provided by the invention that involves depositing a metal on a surface. The method according to this embodiment involves providing an applicator having a contoured surface including at least one protrusion having an outward-facing application surface defining an application pattern, and applying to the at least one protrusion of the applicator a ligating chemical agent capable of binding to a substrate surface and capable of ligating to an electroless plating catalyst. The ligating chemical agent is then transferred, essentially instantaneously, to a first region of a substrate surface in a pattern corresponding to the protrusion pattern by bringing the at least one protrusion into contact with the first region of the substrate surface. A second region of the surface, contiguous with the first region, remains free of the ligating chemical agent. The substrate surface is then contacted with a solution of an electroless plating catalyst, which is bound to the surface by ligating to the ligating chemical agent. A metal is then deposited, via a reaction involving the bound electroless plating catalyst, at the surface delineating a pattern including at least one portion having a dimension parallel to the substrate of less than about one millimeter (mm).

The present invention also provides articles formed in accordance with any of the above-noted methods, or formed independently of these methods. According to one embodiment, an article of the invention includes a substrate and a metal pathway on the substrate that delineates a pattern on a first region of the substrate. The pattern includes at least one region defining a continuous portion of metal deposited on the substrate via reaction involving an electroless plating catalyst promoting deposition of a metal, bound to a ligating chemical agent transferred to the substrate from an applicator. The linear portion of the metal has a dimension parallel to the substrate of less than about one mm.

The embodiments of the invention described above can be carried out using an applicator that is a stamp, for example, a stamp having an elastomeric application surface (e.g., an elastomeric stamp), including a stamping surface selected in conjunction with a ligating chemical agent such that the ligating chemical agent can be applied to the stamping surface, carried by the stamping surface, and transferred from the stamping surface to a region of a substrate surface. The stamp can be re-applied to the substrate surface any number of times in any number of orientations relative to the substrate surface, and/or a plurality of different stamping surfaces can be brought into contact with a substrate surface to form a pattern created by the combination of stamping surfaces.

The embodiments of the invention described above can be carried out by other printing techniques known in the art, such as ink jet printing, or by the uniform transfer of ligating chemical agent from the solution of the agent by techniques such as spin-coating or dipping or doctor blading.

The terms "ligate" or "ligating" or "ligation" or "bind" or "binding" or "bound", as used herein, in reference to the interaction between a catalyst and the ligating chemical agent or ligating copolymer of the invention, or between a substrate surface and the ligating chemical agent or ligating copolymer of the invention, refer to any attraction, binding, complexing, chelating or sequestering, between the ligating chemical agent or ligating copolymer and the catalyst and between the ligating chemical agent and ligating copolymer and the substrate surface.

Other advantages, novel features and objects of the invention will become apparent from the following detailed description of the invention when considered in conjunction with the accompanying drawings.

DETAILED DESCRIPTION OF THE INVENTION

Figure 1:
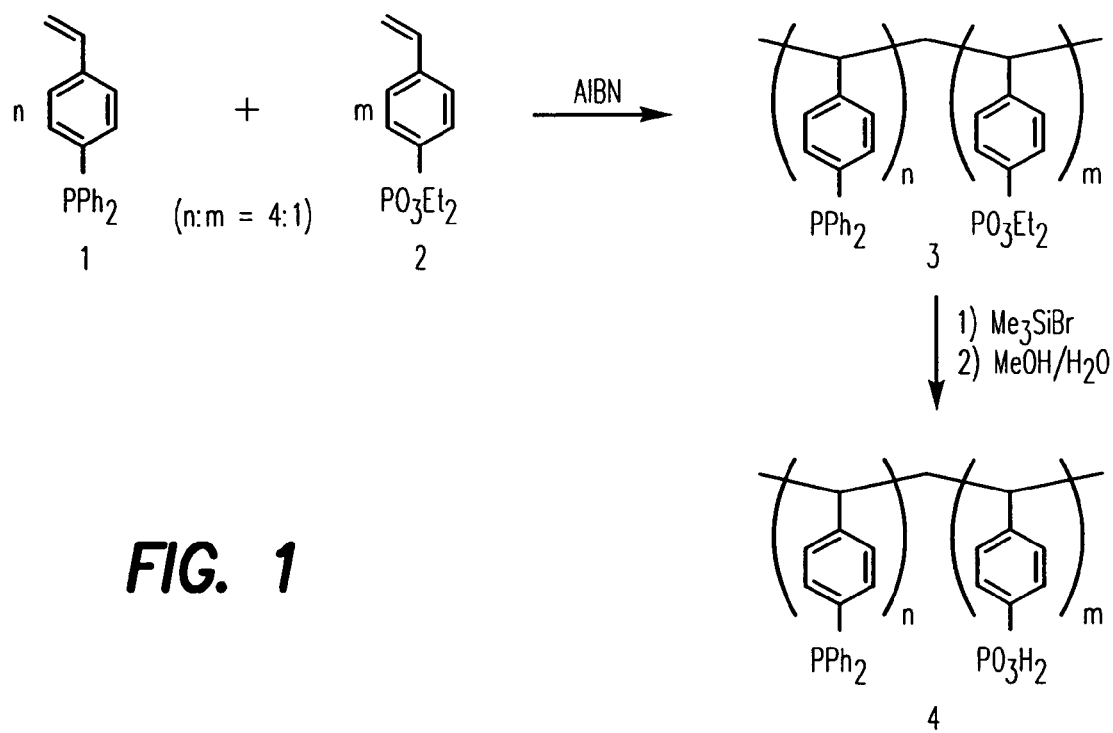
FIG. 1 depicts a chemical synthesis procedure to prepare a ligating random copolymer of the present invention.

The ligating copolymers of the present invention can be used to immobilize catalysts in a number of applications, as described below. One example of an application, the immobilization of electroless plating catalysts for metallization of a substrate, will be described in detail below for purposes of illustration only.

The ligating copolymers of the present invention can be applied and bound to the surface of a substrate by printing techniques known in the art, such as microcontact printing, ink jet printing, or by the uniform transfer of ligating copolymer from the solution of the agent by techniques such as spin coating, dip coating or doctor blading. Binding of the ligating copolymer to the surface is accomplished by the phosphonic acid functionalities of the ligating copolymer. Phosphonic acids are known to bind covalently to many oxide surfaces, for example, silicon oxide, zirconium oxide, titanium oxide, indium oxide, nickel oxide, copper oxide, aluminum oxide and others.

The film of ligating copolymer provides a surface containing phosphine functional groups capable of binding a catalyst from solution. One method of binding a catalyst to a surface is by a metal-ligand complexation, or ligation reaction. Functional groups capable of coordinating to metals include, for example, phosphines, thiols, amines, nitriles, isonitriles, or combinations thereof. Particularly preferred are phosphine groups, which are widely used in the art. Another way of binding a catalyst to a surface is by electrostatic interactions. For example, commercially available palladium/tin colloidal catalysts used in electroless metallization have a net negative charge on the colloid surface. Examples of positively charged groups capable of binding such a catalyst include ammonium salts and phosphonium salts. Particularly preferred are phosphonium salts.

The ligating copolymer is capable of ligating to a catalyst either directly or after undergoing a desired chemical reaction at the surface. For example, a ligating copolymer containing phosphine groups may be coated onto a surface and used to directly ligate a catalyst through a coordination reaction. Alternatively, the film of ligating copolymer containing phosphine groups may be contacted with an acidic solution, for example, hydrochloric acid, to convert the phosphine groups to phosphonium salt groups. These phosphonium salt groups may then ligate to a catalyst through electrostatic interactions. The reaction to convert phosphine groups to phosphonium groups may occur in a separate step, or more conveniently in the same solution of the catalyst. For example, commercially available colloidal palladium/tin catalysts such as CATAPOSIT 44 sold by Shipley are provided in acidic solution containing hydrochloric acid.

There are numerous applications for the ligating copolymers of the present invention, as will be apparent to those of ordinary skill in the art. The present invention provides ligating copolymers suitable for use in the immobilization of catalysts on surfaces. For example, the ligating copolymers of the present invention may be used to immobilize electroless plating catalysts on the surface of a substrate. The substrate can then be metallized in an electroless plating solution.

Other applications for the present invention involve the passivation of metal colloids and nanoparticles and of semiconductor nanoparticles. Prior art examples are set forth below. In each case, nanoparticles are fabricated and/or sequestered within a functionalized copolymer. The ligating copolymers of the present invention may be used for such applications, in addition, the ligating copolymers of the present invention may also be used to bind the resulting copolymer-bound nanoparticle to a surface or solid support. This additional function is important, as it prevents the release and loss of desired nanoparticles or colloids to the environment.

An example of using a copolymer to fabricate a sequestered nanoparticle is described by Chan et al. in *Chem. Mater.* 4, 24 (1992) and Chan et al. in *J. Am. Chem. Soc.* 114, 7295 (1992), incorporated herein by reference. These articles describe the preparation of metal nanoclusters via microphase separation of a ligating diblock copolymer, metal complex coordination, and controlled decomposition of the confined metal complexes to yield metal nanoclusters that are immobilized within the copolymer. Examples of a similar procedure using both random and block copolymers to prepare iron, nickel, palladium and platinum colloids are described by Smith in U.S. Pat. Nos. 4,252,672 and 4,252,677, incorporated herein by reference. Another example is given by Chernyshov et al. in *Chem. Mater.* 12, 114 (2000), incorporated herein by reference, in which a phosphine-functionalized block copolymer is used to ligate to a palladium complex, followed by reduction of the palladium to yield copolymer-bound palladium nanoparticles. The ligating copolymers of the present invention add the capability of immobilizing copolymer-bound metal nanoclusters or colloids on a solid support.

Another application is described by Fogg et al. in *Macromolecules* 30, 417 (1997), incorporated herein by reference, in which cadmium selenide quantum dots are sequestered within phosphine-functionalized block copolymers. The ligating copolymers of the present invention add the capability of binding these quantum dots to a solid support or surface.

The amphiphilic nature of the ligating copolymers of the present invention indicate their potential use as solubilizing agents for metal salts and metal colloids, as described by Antonietti et al. in *Macromolecules* 29, 3800 (1996), incorporated herein by reference. Another potential use for the amphiphilic ligating copolymers of the present invention is their use in the extraction and separation of metals. An example of the use of copolymers in metal extraction is described by DeSimone et al. in U.S. Pat. No. 6,176,895, incorporated herein by reference.

Another application of the present invention is in the field of catalysis of organic reactions, in which metal catalysts are immobilized on a solid support to enable the separation of the catalyst from organic reaction products and prevent loss off the catalyst. An example is described by Bianchini et al. in *J. Chem. Soc., Chem. Commun.* 479 (2000), incorporated herein by reference, in which a copolymer containing a phosphine moiety is used to bind a rhodium catalyst, which is used to catalyze hydrogenolysis reactions. Monomeric phosphine catalysts have also been bound to silica supports, as described by Bianchini et al. in *J. Am. Chem. Soc.* 121, 5961 (1999), incorporated herein by reference. These catalysts were used in hydrogenation and hydroformylation reactions. The ligating copolymers of the present invention may also be used in such applications.

Thus, there are many applications for the ligating copolymers of the present invention. The preparation of these ligating copolymers is described below, along with a detailed description of one application, for purposes of illustration only: the immobilization of electroless plating catalysts on a surface for the patterned electroless metallization of a substrate.

Ligating copolymers of the present invention can be made by a variety of methods. One method involves radical-initiated random copolymerization. Another method involves ring-opening metathesis polymerization to form block copolymers. Other methods may include anionic polymerization, cationic polymerization, ring-opening polymerization, atom transfer radical polymerization or others. Reaction Schemes 1 and 2, as set forth in FIGS. 1 and 2 respectively, are presented for exemplary purposes only and show the preparation of particular ligating copolymers. However, it should be understood that a wide variety of ligating copolymers can be made simply by varying the starting materials or by using different reaction processes.

Referring to FIG. 1, the present invention provides a synthetic procedure to prepare a ligating copolymer of the present invention that is a random copolymer. FIG. 1 depicts the synthetic procedure. The radical initiator AIBN is used to initiate the copolymerization of diethyl 4-vinylbenzenephosphonate 1 (CAS [48153-00-0]) and 4-vinylbenzenediphenylphosphine (CAS [40538-11-2]) 2 in methyl ethyl ketone solvent, to produce poly(4-vinylbenzenediphenylphosphine-co-diethyl 4-vinylbenzenephosphonate) 3. The molecular weight of the copolymer is controlled by the use of n-butanethiol as a chain transfer agent in the polymerization reaction. Hydrolysis of the phosphonic ester groups of 3 using trimethylsilylbromide in methylene chloride solvent, followed by treatment with methanol and water yields ligating copolymer 4, poly(4-vinylbenzenediphenylphosphine-co-4-vinylbenzenephosphonic acid). The n:m ratio for ligating copolymer 4 is between about 50:1 to about 1:50. Preferably, the n:m ratio is about 10:1 to about 1:10 and most preferably about 5:1. The n has a value between about 1 and about 100. Preferably, n has a value between about 10 to about 20. The m has a value between about 1 and about 100. Preferably, m has a value between about 10 to about 20.

Figure 2:
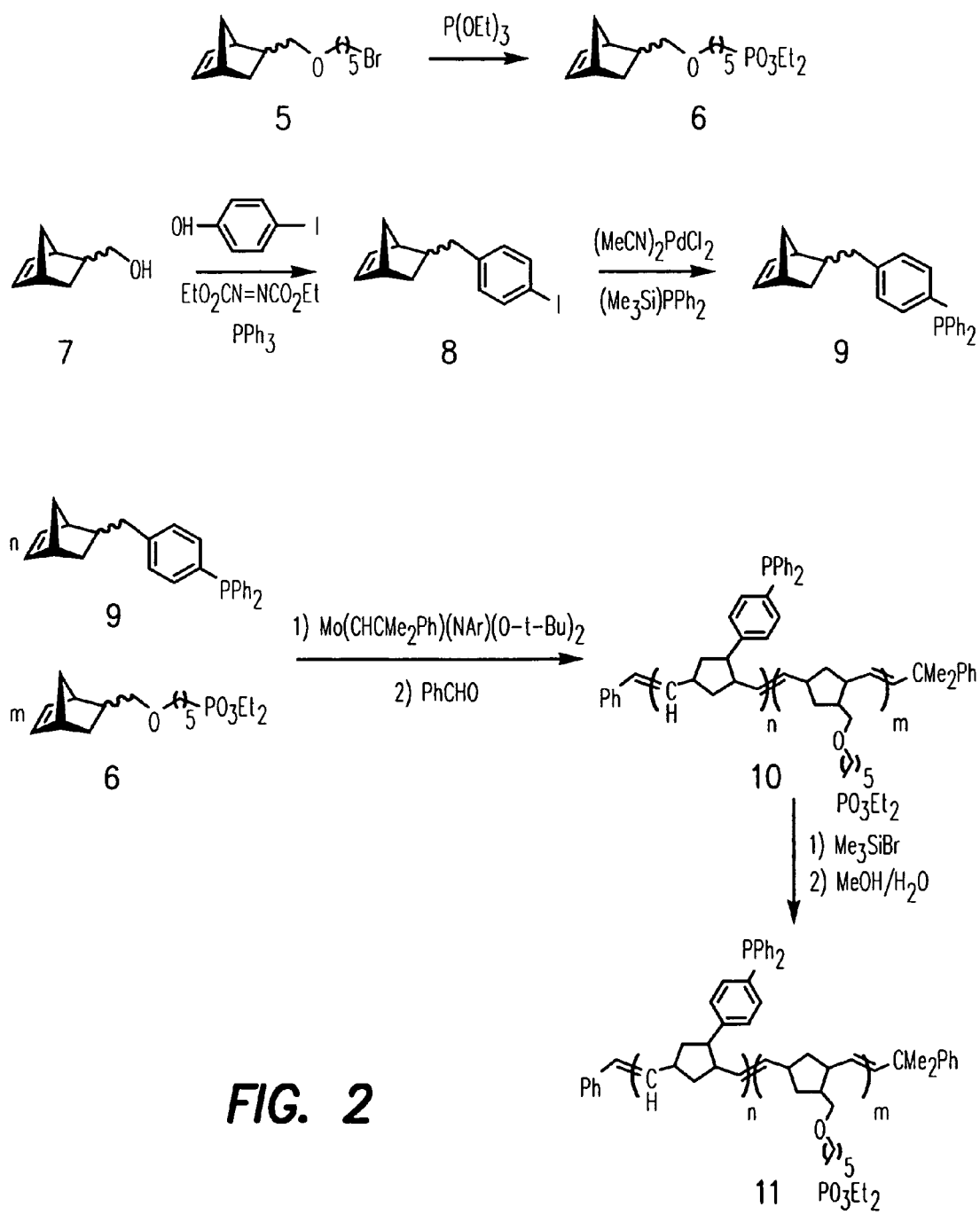
FIG. 2 depicts a chemical synthesis procedure to prepare a ligating block copolymer of the present invention.

The present invention also provides a synthetic procedure to prepare a ligating copolymer of the present invention that is a block copolymer. FIG. 2 depicts the synthetic procedure. Monomer 6, diethyl[5-(bicyclo[2.2.1]hept-5-en-2-ylmethoxy)pentyl]phosphonate is synthesized using the Arbuzov reaction of triethylphosphite and 5-[[(5-bromopentyl)oxy]methyl]bicyclo[2.2.1]hept-2-ene (CAS [145543-77-7]) 5. Monomer 9, [p-(bicyclo[2.2.1]hept-5-en-2-ylmethoxy)phenyl]diphenylphosphine, is synthesized in two steps, starting from 5-norbornene-2-methanol 7. Starting material 7 is first converted to 5-[[(p-iodophenyl)oxy]methyl]bicyclo[2.2.1]hept-2-ene 8. Compound 8 is then converted to monomer 9 by reaction with diphenyl(trimethylsilyl)phosphine. Block copolymer 10, composed of monomers 6 and 9, was prepared using the Schrock catalyst $Mo(CHCMe_2Ph)(NAr)(O-t-Bu)_2$ in a living ring-opening metathesis polymerization reaction, similar to that used by Fogg et al. in *Macromolecules* 30, 417 (1997). Monomer 9 is first polymerized, and after 1 h, monomer 6 is added. The polymerization reaction is quenched using benzaldehyde. The phosphonic acid functionalized copolymer, 11, is synthesized via the hydrolysis of copolymer 10 using trimethylsilylbromide followed by treatment with methanol and water. The n:m ratio for ligating copolymer 11 is between about 50:1 to about 1:50. Preferably, the n:m ratio is about 10:1 to about 1:10 and most preferably about 5:1. The n has a value between about 1 and about 100. Preferably, n has a value between about 10 to about 20. The m has a value between about 1 and about 100. Preferably, m has a value between about 10 to about 20.

The present invention provides a method to selectively deposit metallic films over substrates using a patterning method, such as microcontact printing, of certain ligating chemical agents such as the ligating copolymers described above. According to one aspect, the invention involves metal plating on a substrate by direct application onto the substrate of a ligating chemical agent that is capable of binding to the substrate surface and capable of ligating to an electroless plating catalyst, followed by ligation of the electroless plating catalyst by the ligating chemical agent and deposition of metal on the catalyzed regions of the substrate. Thus, prior art methods involving, for example, application of a ligating chemical agent, patterning by photolithography, ligation of an electroless plating catalyst and metal deposition are reduced essentially to three steps by the invention: application of the ligating chemical agent, followed by ligation of an electroless plating catalyst, followed by metal deposition. In addition, the present invention uses low-cost methods of patterning, such as microcontact printing, rather than photolithography, which is costly and requires expensive, sophisticated equipment to achieve similar patterning results. Other prior art methods use microcontact printing of certain electroless plating catalysts followed by metal deposition, but the process flow is still three steps: pretreatment of the substrate with an adhesion promoter, followed by microcontact printing of certain electroless plating catalysts, followed by metal deposition. The catalysts and, more particularly, the solvents in which they are dissolved are often detrimental to the microcontact printing applicator. For example, solutions of high or low pH may damage the surface of the stamp and reduce the number of times it may be used. Other solvents readily absorb into the stamp material, swelling it and thus distorting the stamp pattern. The type of catalyst used is thus critical to this process. Commercially available palladium/tin catalysts, commonly used in manufacturing, cannot easily be used. The present invention solves problems with this approach by using microcontact printing of ligating chemical agents that are soluble in solvents that are not harmful to the applicator used in microcontact printing. Since the electroless plating catalyst is applied after patterning by microcontact printing, a wider variety of catalyst materials can be used. Commercially available electroless plating catalysts and plating baths may be used. Articles having patterned metal features with submicron dimensions can result.

Devices fabricated in accordance with the invention can be used for a variety of purposes that will be apparent to those of ordinary skill in the art, for example microelectronics, optics, electronic displays, antennas, and the like. For purposes of illustration, but not by way of limitation, the description that follows illustrates the manufacture of electronic devices.

The process of the invention provides a method for formation of metal deposits in a selective pattern over essentially any solid substrate. In an embodiment of the present invention, the process comprises the following steps:

(a) providing a suitably prepared substrate;

(b) providing a suitable ligating chemical agent capable of binding to the substrate and to an electroless plating catalyst;

(c) forming a patterned film of the ligating chemical agent over the substrate;

(d) contacting the ligating groups of the ligating chemical agent with a solution of an electroless plating catalyst;

(e) depositing metal over the catalyzed surface to form a metal deposit in a desired selected pattern; and (f) optionally building a second metal layer over the first metal layer.

The present invention provides the selection of ligating chemical agents capable of binding to a substrate surface and capable of ligating to an electroless plating catalyst. Suitable ligating chemical agents have at least two functionalities: one for attracting, binding, complexing, chelating or otherwise interacting with surfaces and the other capable of ligating to electroless plating catalysts, either directly or after undergoing a desired chemical reaction at the surface. Suitable ligating chemical agents include, for example, random copolymers, block copolymers, bifunctional molecules, or combinations thereof, in which the binding and ligation functions may be performed by multiple chemical groups with bond formation or other linkage between each of the groups. The linkage connecting the multiple functional groups may be of variable length and chemical composition.

In one embodiment of the present invention, the ligating chemical agent is a polymer compound comprising:

at least one subunit with the chemical structure:

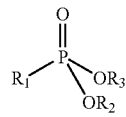

where $R_1$ is a substituted or unsubstituted alkyl group, a substituted or unsubstituted aryl group or a substituted or unsubstituted heterocyclic group and where $R_2$ and $R_3$ are hydrogen atoms; and at least one subunit with the chemical structure:

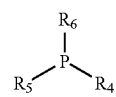

where $R_4$, $R_5$ and $R_6$ are substituted or unsubstituted alkyl groups, substituted or unsubstituted aryl groups, substituted or unsubstituted heterocyclic groups, or hydrogen atoms, and may be the same or different.

In another embodiment of the present invention, the ligating chemical agent has the chemical structure $R_7R_8P(CH_2)_nPO_3R_9R_{10}$, where n is between 1 and 20 and $R_7$ and $R_8$ are substituted or unsubstituted alkyl groups, substituted or unsubstituted aryl groups, substituted or unsubstituted heterocyclic groups, or hydrogen atoms, and may be the same or different, and $R_9$ and $R_{10}$ are hydrogen atoms.

In another embodiment of the present invention, the ligating chemical agent has the chemical structure:

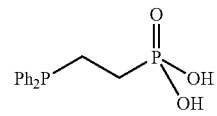

Examples of functional groups capable of interacting with oxide surfaces, such as glass ($SiO_2$), nickel oxide, aluminum oxide, copper oxide, indium tin oxide and others, include, for example, silanes, phosphonic acids, carboxylic acids, hydroxamic acids, amines, amides, or combinations thereof. Particularly preferred are phosphonic acids.

The film of ligating chemical agent provides a surface containing a chemical functional group capable of binding electroless metallization catalysts from solution. One way of binding a catalyst to a surface is by a metal-ligand complexation, or ligation reaction. Examples of functional groups capable of coordinating to metals used as electroless plating catalysts include phosphines, thiols, amines, nitrites, isonitriles. Particularly preferred are phosphine groups. Another way of binding a catalyst to a surface is by electrostatic interactions. For example, commercially available palladium/tin colloidal catalysts have a net negative charge on the colloid surface. Examples of positively charged groups capable of binding such a catalyst include ammonium salts and phosphonium salts. Particularly preferred are phosphonium salts.

The ligating chemical agent is capable of ligating to an electroless plating catalyst either directly or after undergoing a desired chemical reaction at the surface. For example, a ligating chemical agent containing phosphine groups may be coated onto a surface and used to directly ligate an electroless plating catalyst through a coordination reaction. Alternatively, the film of ligating chemical agent containing phosphine groups may be contacted with an acidic solution, for example, hydrochloric acid, to convert the phosphine groups to phosphonium salt groups. These phosphonium salt groups may then ligate to an electroless plating catalyst through electrostatic interactions. The reaction to convert phosphine groups to phosphonium groups may occur in a separate step, or more conveniently in the same solution of electroless plating catalyst. For example, commercially available colloidal palladium/tin catalysts, such as, CATAPOSIT 44 sold by Shipley are provided in acidic solution containing hydrochloric acid.

In the preferred embodiment of the invention, the ligating chemical agent selected is comprised of phosphine groups and phosphonic acid groups. In another preferred embodiment of the invention, the ligating chemical agent is a random copolymer such as poly(4-vinylbenzenediphenylphosphine-co-4-vinylbenzenephosphonic acid) 4. In another preferred embodiment of the invention, the ligating chemical agent selected is a block copolymer such as [p-(bicyclo[2.2.1]hept-5-en-2-ylmethoxy)phenyl]diphenylphosphine-diethyl [5-(bicyclo[2.2.1]hept-5-en-2-ylmethoxy)pentyl]phosphonate block copolymer 11. In another preferred embodiment, the ligating chemical agent selected is a bifunctional molecule such as 2-(diphenylphosphino)ethylphosphonic acid. In each preferred embodiment above, the phosphonic acid group is the binding group used to bind the ligating chemical agent to the surface of the substrate, and the phosphine group is the ligating group used to ligate to an electroless plating catalyst.

In a preferred embodiment of the invention, using a substrate that does not inherently comprise suitable groups to bind the ligating chemical agent, the surface of the substrate is modified to impart the necessary functional groups to the surface. Substrate modification methods include, but are not limited to, thermolysis, reaction of the surface with one or more chemical agents, irradiation with photons or ions, vapor phase modification, graft polymerization, x-ray and nuclear radiation treatment, and plasma oxidation or, more generally, any treatment that effects the desired conversion of the substrate. One potential modification sequence provides chemically etching a polyethylene surface with a $Cr_2O^{2-}$ solution to provide hydroxyl groups on the substrate surface. The hydroxyl groups should then condense with a suitable ligating chemical agent containing a binding group such as phosphonic acids, hydroxamic acids and silanes.

In accordance with the most preferred embodiment of the reaction, the substrate possesses the necessary functional groups capable of binding the ligating chemical agent without requiring modification of the substrate surface. For example, the surface of glass possesses SiOH groups capable of binding ligating chemical agents containing compatible binding groups such as phosphonic acids, hydroxamic acids, and silanes. Other examples of such surfaces include, but are not limited to aluminum oxide, copper oxide, titanium oxide, zirconium oxide, nickel oxide, indium oxide, indium tin oxide, indium zinc oxide, or combinations thereof.

The substrate can be an electrical conductor, non-conductor, or semiconductor and can be made of glass, silicon (including a native oxide layer), a polymer, ceramic or the like.

The ligating chemical agent may be applied using any convenient method. Examples of methods which may be used include printing techniques known in the art, such as microcontact printing, ink jet printing, and screen printing, and methods known in the art for uniform transfer, such as spin-coating, dipping or doctor blading. In the preferred embodiment of the invention, the ligating chemical agent is applied using microcontact printing. Processes and methods for microcontact printing are known in the art. They are disclosed in a number of prior art patents, for example, U.S. Pat. Nos. 5,512,131; 5,900,160; 6,048,623; 6,060,121; 6,180,239, all incorporated herein by reference. Details of the preferred method of microcontact printing are provided below.

A variety of metal-containing compounds may be employed as the electroless plating catalyst, such as, for example, palladium, platinum, rhodium, iridium, nickel, copper, silver, gold, or combinations thereof. Palladium or palladium-containing compounds are preferred. Numerous palladium-containing catalysts are known in the art. They are disclosed in a number of prior art patents, for example, palladium/tin colloidal catalysts are disclosed in U.S. Pat. Nos. 3,874,882; 3,884,704; 3,902,908; and 3,904,792, all incorporated herein by reference. Examples of tin-free palladium catalyst systems are described in U.S. Pat. Nos. 3,937,857; 4,006,047; 5,212,138; 5,219,815; 5,380,560; 5,389,496; 5,510,216; 5,620,584; and 5,925,463, and in Bönnemann, et al., "Preparation and Catalytic Properties of NR4+ Stabilized Palladium Colloids", *Applied Organometallic Chemistry* 8, 361-378 (1994); Reetz, et al., "Size-Selective Synthesis of Nanostructured Transition Metal Clusters" *J. Am. Chem. Soc.* 116, 7401-7402 (1994); Reetz, et al., "Visualization of Surfactants on Nanostructured Palladium Clusters by a Combination of STM and High-Resolution TEM", *Science* 267, 367-369 (Jan. 20, 1995), all incorporated herein by reference.

Particularly preferred electroless plating catalysts include palladium/tin colloidal catalysts, such as commercially available CATAPOSIT 44 or FIDELITY 1018 sold by Fidelity Chemical Products. The electroless plating catalysts are preferably applied to the substrate as an aqueous solution.

Means for contacting the film of ligating chemical agent with a catalyst solution vary widely and include any means known in the art. Suitable means include, for example, immersion of the substrate in a solution and spraying. The catalyst solution contact time can vary with catalyst solution composition and age.

Electroless metal solutions are those that deposit metal over a catalytically active surface by chemical reduction in the absence of an external electric current. Processes and compositions for electroless metal deposition are known in the art and are in substantial commercial use. They are disclosed in a number of prior art patents, for example, copper plating solutions are disclosed in U.S. Pat. Nos. 3,615,732; 3,615,733; 3,728,137; 3,846,138; 4,229,218; and 4,453,904, all incorporated herein by reference. Electroless nickel plating solutions are described in U.S. Pat. Nos. 2,690,401; 2,690, 402; 2,762,723; 3,420,680; 3,515,564; and 4,467,067, all incorporated herein by reference. A large number of copper and nickel plating solutions are commercially available. Other metals that may be electrolessly deposited include gold, palladium, cobalt, silver, and tin-lead alloys. The preferred electroless metals for purposes of this invention are copper and nickel with nickel being most preferred.

The invention will be better understood by reference to FIGS. 3 through 6, which depict a preferred embodiment of the invention. FIGS. 3a-h depict process steps suitable for fabrication of a selectively metallized article using the process of the invention.

FIGS. 3a-h are schematic illustrations of a method of depositing a metal on a substrate surface. At FIG. 3a, an applicator, in particular a stamp 20, is provided having a surface 22 including indentations 24 formed therein and defining an indentation pattern, the indentations contiguous with an application surface 26 defining an application pattern. Defined another way, surface 22 includes protrusions 26, each having an outward-facing surface defining an application pattern. Although not shown, indentations 24 may be interconnected to form a single, continuous, patterned indentation and/or protrusions 26 may be interconnected to form a single, continuous, patterned protrusion. Thus, protrusions 26 may define a patterned application surface, including a plurality of application regions isolated by an intervening indentation(s), or a patterned stamping surface that is a single, continuous region contiguous with a continuous indentation or indentations.

For purposes of illustration, a preferred embodiment of an applicator including a plurality of protrusions is described and illustrated. It is to be understood, however, that any applicator that is capable of carrying a ligating chemical agent and transferring the ligating chemical agent to a substrate surface finds use in the invention. For example, a flat applicator to which a pattern of ligating chemical agent is applied (for example using techniques as described in the present invention or other techniques) can be used to transfer the ligating chemical agent, in the pattern, to a substrate surface. Moreover, the shapes of the protrusions described and illustrated need not be of essentially rectangular cross section, but can be of any shape.

Figure 3A:
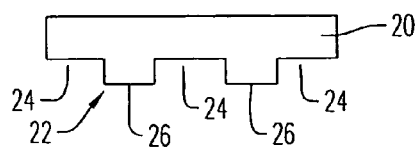
FIGS. 3a, b, c, e, and g illustrate schematically a process of microcontact printing of a ligating copolymer at defined regions of a substrate, followed by ligation of an electroless plating catalyst and deposition of a metal at the defined regions.
Figure 3B:
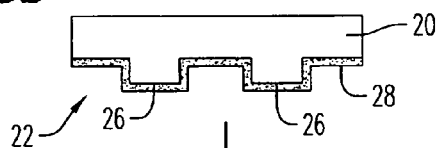
FIGS. 3d, f and h represent enlarged sections corresponding to FIGS. 3c, e and g between Section lines A and B.
Figure 3C:
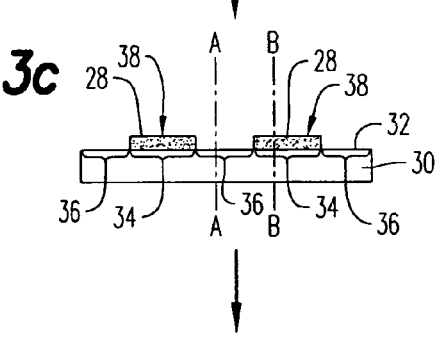

Referring FIGS. 3b and 3c, prior to microprinting, application surface 26, typically the entire surface 22 of the applicator, is coated with a chemical ligating agent 28. According to the method, stamp 20 is placed, in a predetermined orientation, adjacent to substrate 30 that includes a surface 32 facing the stamp. The stamp is positioned in a first orientation, adjacent to surface 32, such that stamping surface 26 contacts first portions 34 of substrate surface 32. Stamping surface 26 is held against portions 34 of surface 32 of substrate 30 to hold ligating chemical agent 28 against the material surface to allow the binding group of ligating chemical agent 28 to bind thereto. In FIG. 3c, stamp 20 has been removed from surface 32 to provide film 38 of the ligating chemical agent 28 on surface 32 according to the stamping pattern of stamping surface 26. Second portions 36 of surface 32, contiguous with first portions 34, remain free of ligating chemical agent 28. Thus regions 34 of substrate surface 32 that correspond to the stamping pattern 26 receive the ligating chemical agent. In accordance with the description of stamping surface 26 and indentations 24 above, the pattern of ligating chemical agent 28 applied to surface 32 can be a continuous region or can be a plurality of isolated regions.

Figure 3D:
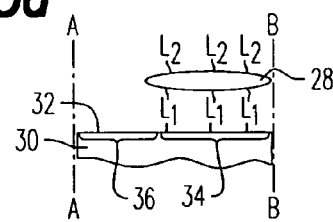

For purposes of illustration, the interface of the substrate 30 with film 38 of ligating chemical agent 28 lying between section lines A-A and B-B in FIG. 3c is illustrated in FIG. 3d. As shown in FIG. 3d, portions 34 of substrate surface 32 are coated with ligating chemical agent 28 having a terminus group L1 bonded to the substrate, and having a second terminus group L2 capable of chemical transformation and ligation to an electroless plating catalyst. Groups L1 and L2 are separated from each other by an inert spacer group such as a hydrocarbon chain. Ligating chemical agent 28 may be a bifunctional molecular, block copolymer, or random copolymer. In each case, ligating chemical agent 28 contains groups L1 and L2, connected by an inert spacer group.

Figure 3E:
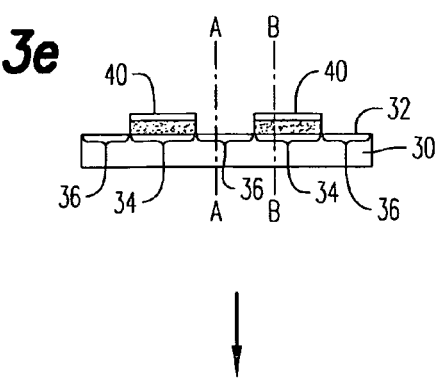
Figure 3F:
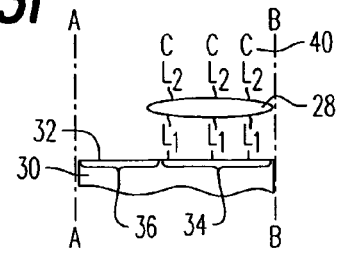

FIG. 3e illustrates substrate 30 after it has been contacted with a solution of electroless plating catalyst to form a catalytic layer 40. As shown, the substrate has been contacted with the electroless plating catalyst, rinsed, and dried. Referring to FIG. 3f, which depicts substrate 30 between lines A-A and B-B in FIG. 3e. The electroless plating catalyst ligates to groups L2 of ligating chemical agent 28, but is rinsed away from portions 36 of substrate 30. In this way, plating is restricted solely to those areas where plating metal is desired avoiding extraneous plating in undesired areas.

Figure 3G:
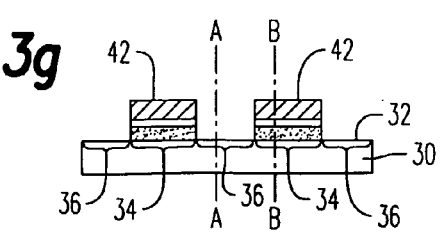
Figure 3H:
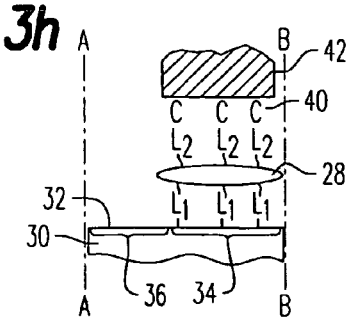

Following formation of catalytic layer 40, the substrate may be plated by contact with an electroless plating solution to form a metal deposit 42 over catalytic layer 40, corresponding to the stamping pattern of stamping surface 26. This step is illustrated in FIG. 3g. The metal deposit may range in thickness from about 100 angstroms to several hundred microns dependent upon the final use of the article. The thickness of the deposit is dependent upon the immersion time in the plating solution, its temperature and the concentration of components within the solution. The deposition of metal over the catalyzed ligating chemical agent is better illustrated in FIG. 3h, which depicts substrate 30 between lines A-A and B-B in FIG. 3g.

Figure 4A:
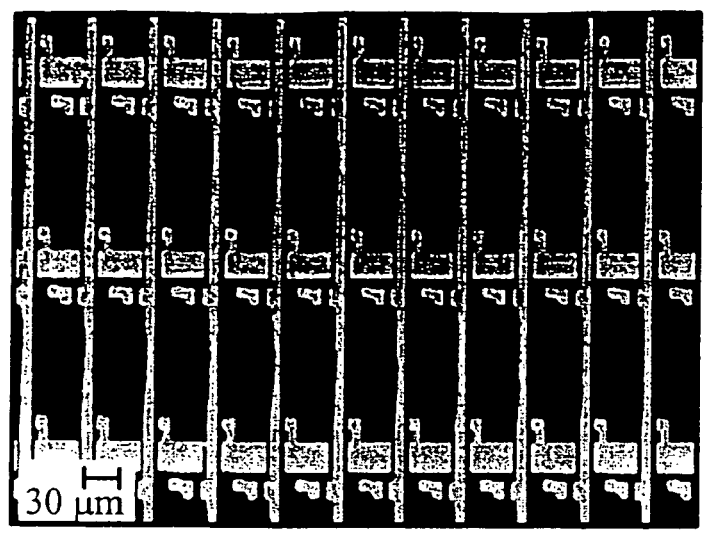
FIGS. 4a and b are optical micrographs of boron-doped nickel patterns on a glass substrate produced using the technique illustrated in FIG. 3.
Figure 4B:
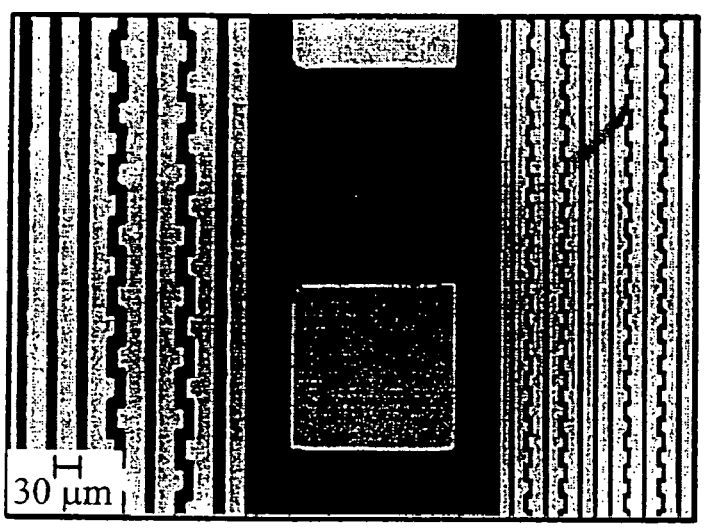
FIG. 4c is a scanning electron micrograph of boron-doped nickel patterns on a glass substrate produced using the technique illustrated in FIG. 3.
Figure 4C:
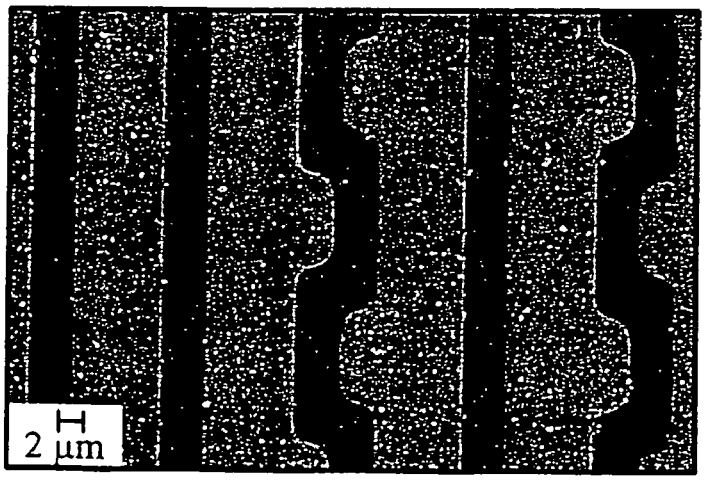

Referring now to FIGS. 4a-c, optical images and a scanning electron micrograph of typical boron-doped nickel microstructures that can be produced by the methods of the present invention are shown. FIGS. 4a and 4b illustrate boron-doped nickel features (light regions) deposited onto a glass substrate (dark background) and FIG. 4c shows a scanning electron micrograph of boron-doped nickel features (light regions) deposited onto a glass substrate (dark background), following application of a ligating chemical agent, random copolymer 4 (with reference to FIG. 1 above), to the glass substrate using a stamp in accordance with the invention having a stamping, or application surface 26 (with reference to FIG. 3) corresponding to the pattern of deposited metal shown, and exposure of the patterned glass substrate with a solution of a colloidal palladium/tin electroless plating catalyst.

Figure 5A:
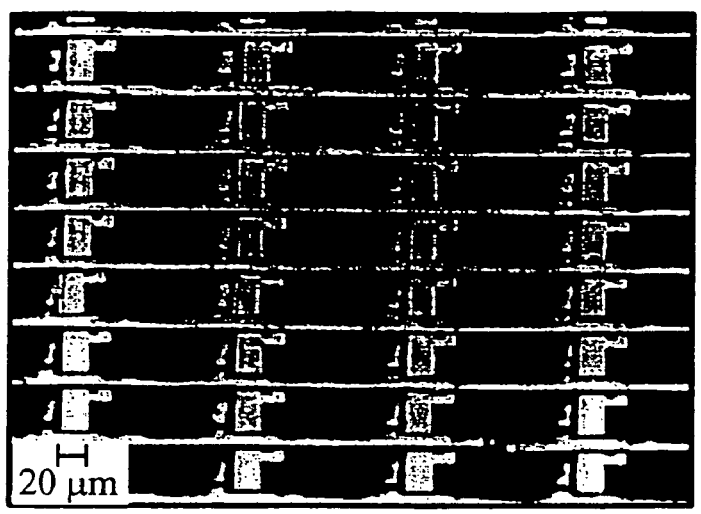
FIGS. 5a and b are optical micrographs of copper patterns on a glass substrate using the technique illustrated in FIG. 3.
Figure 5B:
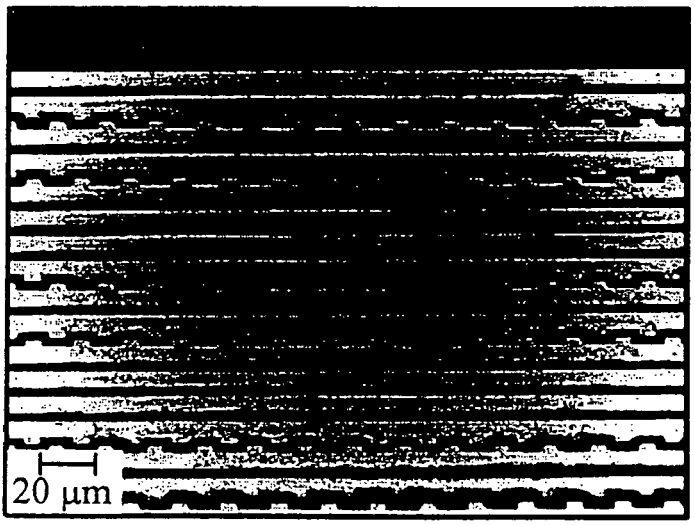
FIG. 5c is a scanning electron micrograph of boron-doped nickel patterns on a glass substrate produced using the technique illustrated in FIG. 3.
Figure 5C:
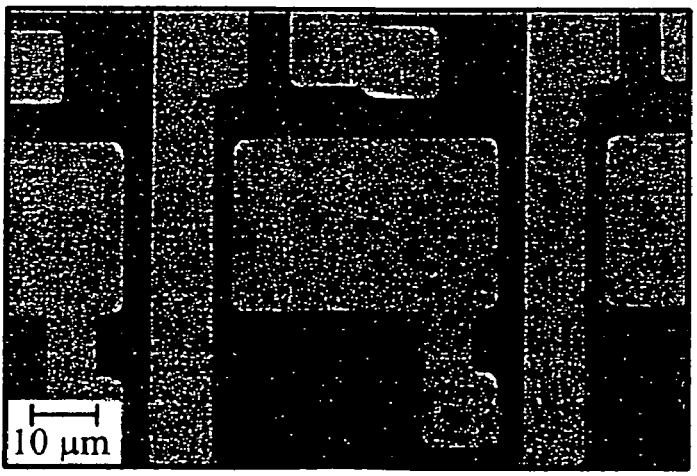

Referring now to FIGS. 5a-d, optical images and a scanning electron micrograph of typical copper microstructures that can be produced by the methods of the present invention are shown. FIGS. 5a and 5b illustrate copper features (light regions) deposited onto a glass substrate (dark background) and FIG. 5c is a scanning electron micrograph of copper features (light regions) deposited onto a glass substrate (dark background), following application of a ligating chemical agent, random copolymer 4, to the glass substrate using a stamp in accordance with the invention having a stamping, or application surface 26 (with reference to FIG. 3) corresponding to the pattern of deposited metal shown, and exposure of the patterned glass substrate with a solution of a colloidal palladium/tin electroless plating catalyst. FIG. 5*d* illustrates copper features (light regions) deposited onto a glass substrate (dark background) following application of a ligating chemical agent, bifunctional molecular species 2-(diphenylphosphino)ethylphosphonic acid, to the glass substrate using a stamp in accordance with the invention having a stamping, or application surface 26 (with reference to FIG. 3) corresponding to the pattern of deposited metal shown, and exposure of the patterned glass substrate with a solution of a colloidal palladium/tin electroless plating catalyst.

Figure 6:
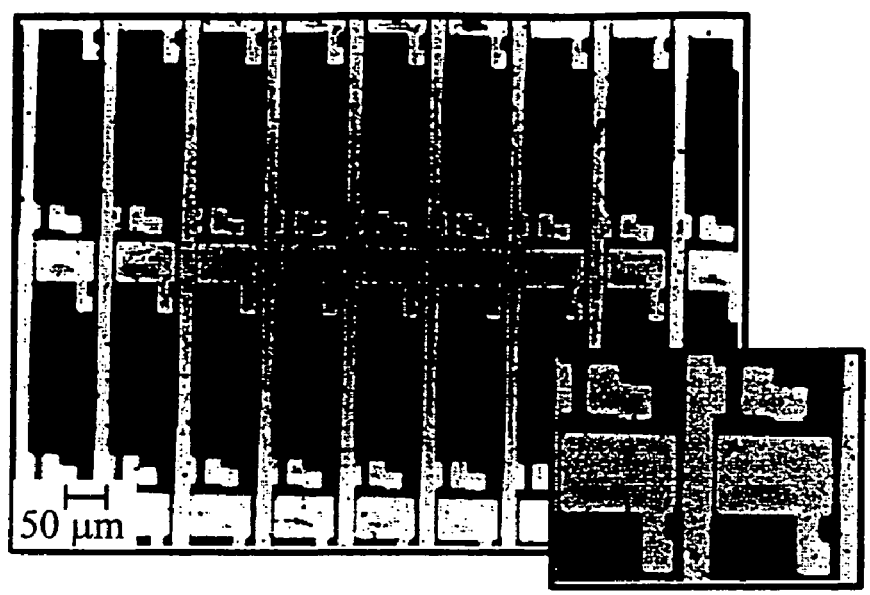
FIG. 6 is another further magnified optical micrograph of copper patterns on a glass substrate using the technique illustrated in FIG. 3.

Referring now to FIG. 6, a magnified optical image of a typical copper microstructure that can be produced by the methods of the present invention is shown. FIG. 6 illustrates copper features (light regions) deposited onto a glass substrate (dark background) following application of a ligating chemical agent, bifunctional molecular species 2-(diphenylphosphino)ethylphosphonic acid, to the glass substrate using a stamp in accordance with the invention having a stamping, or application surface 26 (with reference to FIG. 3) corresponding to the pattern of deposited metal shown, and exposure of the patterned glass substrate with a solution of a colloidal palladium/tin electroless plating catalyst.

The function and advantage of these and other embodiments of the present invention will be more fully understood from the examples below. The following examples are intended to illustrate the benefits of the present invention, but do not exemplify the full scope of the invention.

Example 1

Detailed Synthetic Procedure of Poly(4-vinylbenzenediphenylphosphine-co-diethyl 4-vinylbenzenephosphonate) 3

AIBN (20 mg) was added to a solution of diethyl 4-vinylbenzenephosphonate 1 (300 mg, 1.25 mmol) and 4-vinylbenzenediphenylphosphine 2 (1.44 g, 5 mmol) in 7 mL of methyl ethyl ketone containing 0.2 g of n-butanethiol. The resulting solution was refluxed for 3 h. After cooling to room temperature, the solvent was evaporated on a rotary evaporator. The oily residue was dissolved in 2 mL of dichloromethane and added dropwise to 100 mL of hexane with vigorous stirring. The precipitate (1.05 g) was filtered, washed thoroughly with hexane and dried in vacuum oven to give off-white powder. $^1$H NMR (250 MHz, 25° C., CDCl$_3$): δ 7.50-7.17 (br, Ar—H), 6.45 (br, Ar—H), 4.02 (br, POCH$_2$CH$_3$), 1.29 (br, POCH$_2$CH$_3$), 1.22 (br, CH$_2$).

Example 2

Detailed Synthetic Procedure of Poly(4-vinylbenzenediphenylphosphine-co-4-vinylbenzenephosphonic acid) 4

Copolymer 3 (0.8 g) was dissolved in 5 mL of anhydrous dichloromethane and treated with 0.5 mL of bromotrimethylsilane. The solution was stirred under nitrogen for 18 h, after which time the solvent was evaporated under reduced pressure. The oily residue was dissolved in 2 mL of anhydrous methanol and added dropwise to 50 mL of anhydrous diethyl ether. The white precipitate was filtered, washed with diethyl ether and dried in a vacuum oven at 50° C. overnight.

Example 3

Detailed Synthetic Procedure of Diethyl[5-(bicyclo[2.2.1]hept-5-en-2-ylmethoxy)pentyl]phosphonate 6

5-[[(5-bromopentyl)oxy]methyl]bicyclo[2.2.1]hept-2-ene 5 (10 g) was added to 50 mL of triethylphosphite and the solution was heated at 160° C. under nitrogen for 20 h. The solution was cooled to room temperature and excess triethylphosphite was removed under reduced pressure. The oily residue was distilled in vacuo to give 6 as a colorless oil, b.p. 145° C., 0.15 Torr. $^1$H NMR (500 MHz, 25° C., CDCl$_3$): δ (endo isomer, 85%) 6.07-6.05 (m, 1H, olefinic), 5.87-5.85 (m, 1H, olefinic), 4.06-4.00 (m, 4H, POCH$_2$CH$_3$), 3.34-2.94 (m, 6H, CH$_2$), 2.84 (br s, 1H, bridgehead CH), 2.73 (br s, 1H, bridgehead CH), 2.30-2.20 (m, 1H, exo CH), 1.70-1.49 (m, 9H, CH$_2$), 1.27 (t, 6H, POCH$_2$CH$_3$), 0.44-0.41 (m, 1H, endo CH of CH$_2$); (exo isomer, partial) 6.02-6.01 (m, 1H, olefinic), 2.70 (br s, 1H, bridgehead CH). $^{13}$C {$^1$H} NMR (125 MHz, 25° C., CDCl$_3$): δ (endo isomer) 137.0 (olefinic CH), 132.5 (olefinic CH), 74.6 (CH—CH$_2$O), 61.4 (d, $|^2J_{C-P}|$=6 Hz, POCH$_2$CH$_3$), 49.4 (CH$_2$ bridge), 44.0 (bridgehead CH), 42.2 (bridgehead CH), 38.9 (CH—CH$_2$O), 29.3 (CH$_2$), 27.4 (CH$_2$), 27.3 (CH$_2$), 25.7 (d, $|^1J_{C-P}|$=140 Hz, CH$_2$P), 22.4 (CH$_2$), 22.3 (CH$_2$), 16.5 (d, $|^3J_{C-P}|$=5.4 Hz, POCH$_2$CH$_3$); (exo isomer, partial) 136.6 (olefinic CH), 75.6 (CH—CH$_2$O), 45.0 (CH), 43.8 (CH), 41.6 (CH), 29.8 (CH$_2$). $^{31}$P{$^1$H} NMR (200 MHz, 25° C., CDCl$_3$): δ 32.6

Example 4

Detailed Synthetic Procedure of 5-[[(p-iodophenyl)oxy]methyl]bicyclo[2.2.1]hept-2-ene 8

Diethylazodicarboxylate (8.7 g) was added dropwise to a solution of 5-norbornene-2-methanol (6.2 g, 0.05 mol), 4-iodophenol (11.0 g, 0.05 mol) and triphenylphosphine (13.1 g, 0.05 mol) in 100 mL of anhydrous tetrahydrofuran. After completion of the addition, the resulting solution was stirred for 18 h at room temperature. The solvent was removed under reduced pressure and the oily residue was extracted three times with hot hexane. Combined hexane extracts were evaporated under reduced pressure to give 8 (15.0 g, 97%) as a colorless oil.

Example 5

Detailed Synthetic Procedure of [p-(bicyclo[2.2.1]hept-5-en-2-ylmethoxy)phenyl]diphenylphosphine 9

Bis(acetonitrile)dichloropalladium(II) (1 mmol) was placed in a Schlenk flask, stoppered with a septum and evacuated and purged with nitrogen three times. To this flask was then added a solution of 8 (0.038 mol) in 100 mL of anhydrous toluene and 9.6 g of diphenyl(trimethylsilyl)phosphine. The resulting deep purple solution was heated at 70° C. overnight, then cooled to room temperature and the solvent evaporated under reduced pressure. The residue was chromatographed on a column of silica gel using first hexane and then 9:1 hexane ethyl acetate as eluent to collect the product. After evaporation of the solvent, the product 9 (10 g), a mixture of endo and exo isomers, was obtained as white gummy material. Addition of 50 mL of hot pentane to this compound resulted in the separation of white crystalline compound (2.1 g). $^1$H NMR (500 MHz, 25° C., CDCl$_3$): δ (endo isomer, ~85%) 7.30 (m, 12H, Ar—H), 6.88 (m, 2H, Ar—H), 6.18 (m, 1H, olefinic), 5.98 (m, 1H, olefinic), 3.72 (m, 1H, nor-CH$_2$), 3.57 (m 1H, nor-CH$_2$), 3.04 (br s 1H), 2.88 (br s, 1H), 2.53 (m, 1H), 1.92 (m, 1H), 1.51 (d, |J|=8.0 Hz), 1.32 (d, |J|=8.2 Hz, 1H), 0.65 (m, 1H); (exo isomer, partial) 6.92 (m, 2H, Ar—H), 4.05 (m, 1H), 3.88 (m, 1H). $^{31}$P{$^1$H} NMR (200 MHz, 25° C., CDCl$_3$): δ –6.57

Example 6

Detailed Synthetic Procedure of [p-(bicyclo[2.2.1] hept-5-en-2-ylmethoxy)phenyl]diphenylphosphine- diethyl[5-(bicyclo[2.2.1]hept-5-en-2-ylmethoxy) pentyl]phosphonate block copolymer 10

Synthesis of block copolymer 10 was performed in an inert atmosphere using standard dry box and Schlenk techniques. A solution of Mo(CHCMe$_2$Ph)(NAr)(O-t-Bu)$_2$ (1.0 mg, 1.82 mmol) in THF (1 mL) was added all at once to a rapidly stirred solution of 9 (203 mg, 0.545 mmol) in THF (7 mL). After 1 h, a solution of 6 (41 mg, 0.136 mmol) in THF (2 mL) was added, and the mixture stirred for 2 h before quenching by addition of 3 drops of benzaldehyde. The solution was stirred for 2 h and then reduced in volume to 1 mL and added dropwise to degassed MeOH (20 mL). The white solid was collected by filtration, washed with MeOH and dried in vacuo for 24 h. $^{31}$P{$^1$H} NMR (200 MHz, 25° C., CDCl$_3$): δ 32.6 (PO$_3$Et$_2$), –6.57 (PPh$_2$)

Example 7

Detailed Synthetic Procedure of p-(bicyclo[2.2.1] hept-5-en-2-ylmethoxy)phenyl]diphenylphosphine- [5-(bicyclo[2.2.1]hept-5-en-2-ylmethoxy)pentyl] phosphonic acid block copolymer 11

Copolymer 10 (300 mg) was dissolved in 5 mL of anhydrous tetrahydrofuran and treated with 0.1 mL of bromotrimethylsilane. The solution was stirred under nitrogen for 18 h, after which time 10 mL methanol was added and the solution stirred a further 2 h. The solvent was then evaporated under reduced pressure. The oily residue was dissolved in 2 mL of anhydrous tetrahydrofuran and added dropwise to 50 mL of hexanes with vigorous stirring. The white precipitate was filtered, washed with hexanes and dried in a vacuum oven at 50° C. overnight. $^{31}$P{$^1$H} NMR (200 MHz, 25° C., CDCl$_3$): δ 29.6 (br, PO$_3$H$_2$), –6.87 (PPh$_2$)

Substrate Preparations

Glass and silicon substrates were cleaned immediately before use by treatment in a UV ozone cleaner (Jelight Company, Irvine Calif.) for 10 minutes.

Preparation of Treatment Solutions

The catalyst solution used in the examples below is a solution of a colloidal palladium/tin catalyst prepared from CATAPOSIT 44 concentrate and solid CATAPREP 404, as directed by the manufacturer (Shipley Company, Newton, Mass.).

The accelerator solution used in the examples below is a 5% solution of 1019 Accelerator (Fidelity Chemical Products, Newark, N.J.).

One Hundred Percent Copper Metallization Bath—The copper metallization bath used was the 1025 Electroless Copper plating bath available from Fidelity Company Inc. The working bath was prepared by mixing 10 mL of solution 1025A with 80 mL of deionized water. To this solution was added 10 mL of solution 1025B. Fifty Percent Copper Metallization Bath—The 50% copper metallization bath was produced by mixing one volume of the standard 100% copper bath described above with one volume of water. In the examples that follow, all plating was done with the 50% bath. The temperature of the working bath during plating was maintained typically between 20 and 25° C.

One Hundred Percent Nickel Metallization Bath—The nickel metallization bath used was the NIPOSIT 468 Electroless Nickel-Boron plating bath available from Shipley Company Inc. The working bath was prepared by mixing 4 mL of solution A with 88.5 mL of deionized water. To this solution was added 5 mL of solution M and then 2.5 mL of solution B. The bath was adjusted to pH 7.0 by addition of 50% (v/v) aqueous ammonia solution.

Fifty Percent Nickel Metallization Bath—The 50% nickel metallization bath was produced by mixing one volume of the standard 100% nickel bath described above with one volume of water. In the examples that follow, all plating was done with the 50% bath. The temperature of the working bath during plating was maintained typically between 50 and 55° C.

Example 8

Fabrication of a Microcontact Printing Stamp

A template consisting of an exposed and developed photoresist pattern was fabricated by photolithography. A 2-mm-high border was formed by fixing strips of 2-mm-thick adhesive-backed foam around the perimeter of the surface of the template. A 10:1 (w:w or v:v) mixture of PDMS-SYLGARD Silicone Elastomer 184 and SYLGARD Curing Agent 184 (Dow Corning Corp., Midland, Mich.) was degassed under vacuum for about 10 minutes, then the mixture was poured over the template to approximately the height of the foam border. The PDMS cured at 65° C. for 60 minutes. After cooling to room temperature, the PDMS stamp was carefully peeled from the template.

Example 9

Forming Patterned Boron-Doped Nickel Films by Microcontact Printing and Electroless Metallization A stamp fabricated in accordance with Example 8 was fabricated. The stamp was fabricated so as to have an arbitrary pattern surrounded by indented regions. That is, the stamp had a pattern of indentations separating stamping surfaces. The surface was coated with random copolymer 4 in isopropanol at a concentration of 0.5 mg/mL by applying a small volume of solution to cover the surface of the stamp. After allowing the solution to contact the surface of the stamp for 30 s, the stamp surface was dried under a stream of dry dinitrogen. The stamp was applied to a clean glass surface and removed, whereby a pattern of random copolymer 4 is formed. The patterned article was baked on a hotplate at 120° C. for 5 minutes, allowed to cool, then immersed in the electroless plating catalyst solution. After 5 minutes of immersion, the substrate was removed and rinsed thoroughly under running deionized water. The catalyzed substrate was then immersed in the accelerator solution. After 2 minutes of immersion, the substrate was gently rinsed with deionized water. The accelerated substrate was then metallized by electroless plating using the Fifty Percent Nickel Metallization Bath. Plating times were typically 2-5 minutes. Optical micrographs of the resultant metallized patterns are shown in FIGS. 4a and b. A scanning electron micrograph of the resultant metallized pattern is shown in FIG. 4c.

Example 10

Forming Patterned Boron-Doped Nickel by Microcontact Printing and Electroless Metallization The procedure of Example 9 was repeated except that block copolymer 11 was used as the ligating chemical agent.

A stamp fabricated in accordance with Example 8 was fabricated. The stamp was fabricated so as to have an arbitrary pattern surrounded by indented regions. That is, the stamp had a pattern of indentations separating stamping surfaces. The surface was coated with block copolymer 11 in tetrahydrofuran at a concentration of 0.5 mg/mL by applying a small volume of solution to cover the surface of the stamp. After allowing the solution to contact the surface of the stamp for 30 s, the stamp surface was dried under a stream of dry dinitrogen. The stamp was applied to a clean glass surface and removed, whereby a pattern of block copolymer 11 is formed. The patterned article was baked on a hotplate at 120° C. for 5 minutes, allowed to cool, then immersed in the electroless plating catalyst solution. After 5 minutes of immersion, the substrate was removed and rinsed thoroughly under running deionized water. The catalyzed substrate was then immersed in the accelerator solution. After 2 minutes of immersion, the substrate was gently rinsed with deionized water. The accelerated substrate was then metallized by electroless plating using the Fifty Percent Nickel Metallization Bath. Plating times were typically 2-5 minutes.

Example 11

Forming Patterned Boron-Doped Nickel by Microcontact Printing and Electroless Metallization The procedure of Example 9 was repeated except that bifunctional molecular species 2-(diphenylphosphino)ethylphosphonic acid was used as the ligating chemical agent.

A stamp fabricated in accordance with Example 8 was fabricated. The stamp was fabricated so as to have an arbitrary pattern surrounded by indented regions. That is, the stamp had a pattern of indentations separating stamping surfaces. The surface was coated with bifunctional molecular species 2-(diphenylphosphino)ethylphosphonic acid in isopropanol at a concentration of 1 mg/mL by applying a small volume of solution to cover the surface of the stamp. After allowing the solution to contact the surface of the stamp for 30 s, the stamp surface was dried under a stream of dry dinitrogen. The stamp was applied to a clean glass surface and removed, whereby a pattern of bifunctional molecular species 2-(diphenylphosphino)ethylphosphonic acid is formed. The patterned article was baked on a hotplate at 120° C. for 5 minutes, allowed to cool, then immersed in the electroless plating catalyst solution. After 5 minutes of immersion, the substrate was removed and rinsed thoroughly under running deionized water. The catalyzed substrate was then immersed in the accelerator solution. After 2 minutes of immersion, the substrate was gently rinsed with deionized water. The accelerated substrate was then metallized by electroless plating using the Fifty Percent Nickel Metallization Bath. Plating times were typically 2-5 minutes.

Example 12

Forming Patterned Copper Films by Microcontact Printing and Electroless Metallization This example is similar to Example 9 except that the Fifty Percent Copper Metallization Bath was used for metal deposition.

A stamp fabricated in accordance with Example 8 was fabricated. The stamp was fabricated so as to have an arbitrary pattern surrounded by indented regions. That is, the stamp had a pattern of indentations separating stamping surfaces. The surface was coated with random copolymer 4 in isopropanol at a concentration of 0.5 mg/mL by applying a small volume of solution to cover the surface of the stamp. After allowing the solution to contact the surface of the stamp for 30 s, the stamp surface was dried under a stream of dry dinitrogen. The stamp was applied to a clean glass surface and removed, whereby a pattern of random copolymer 4 is formed. The patterned article was baked on a hot plate at 120° C. for 5 minutes, allowed to cool, then immersed in the electroless plating catalyst solution. After 5 minutes of immersion, the substrate was removed and rinsed thoroughly under running deionized water. The catalyzed substrate was then immersed in the accelerator solution. After 2 minutes of immersion, the substrate was gently rinsed with deionized water. The accelerated substrate was then metallized by electroless plating using the Fifty Percent Copper Metallization Bath. Plating times were typically 2-5 minutes. Optical micrographs of the resultant metallized patterns are shown in FIGS. 5a and b. A scanning electron micrograph of the resultant metallized pattern is shown in FIG. 5c.

Example 13

Forming Patterned Copper Films by Microcontact Printing and Electroless Metallization The procedure of Example 12 was repeated except that block copolymer 11 was used as the ligating chemical agent.

A stamp fabricated in accordance with Example 8 was fabricated. The stamp was fabricated so as to have an arbitrary pattern surrounded by indented regions. That is, the stamp had a pattern of indentations separating stamping surfaces. The surface was coated with block copolymer 11 in tetrahydrofuran at a concentration of 0.5 mg/mL by applying a small volume of solution to cover the surface of the stamp. After allowing the solution to contact the surface of the stamp for 30 s, the stamp surface was dried under a stream of dry dinitrogen. The stamp was applied to a clean glass surface and removed, whereby a pattern of block copolymer 11 is formed. The patterned article was baked on a hot plate at 120° C. for 5 minutes, allowed to cool, then immersed in the electroless plating catalyst solution. After 5 minutes of immersion, the substrate was removed and rinsed thoroughly under running deionized water. The catalyzed substrate was then immersed in the accelerator solution. After 2 minutes of immersion, the substrate was gently rinsed with deionized water. The accelerated substrate was then metallized by electroless plating using the Fifty Percent Copper Metallization Bath. Plating times were typically 2-5 minutes.

Example 14

Forming Patterned Copper Films by Microcontact Printing and Electroless Metallization The procedure of Example 12 was repeated except that bifunctional molecular species 2-(diphenylphosphino)ethylphosphonic acid was used as the ligating chemical agent.

A stamp fabricated in accordance with Example 8 was fabricated. The stamp was fabricated so as to have an arbitrary pattern surrounded by indented regions. That is, the stamp had a pattern of indentations separating stamping surfaces. The surface was coated with bifunctional molecular species 2-(diphenylphosphino)ethylphosphonic acid in isopropanol at a concentration of 1 mg/mL by applying a small volume of solution to cover the surface of the stamp. After allowing the solution to contact the surface of the stamp for 30 s, the stamp surface was dried under a stream of dry dinitrogen. The stamp was applied to a clean glass surface and removed, whereby a pattern of bifunctional molecular species 2-(diphenylphosphino)ethylphosphonic acid is formed. The patterned article was baked on a hotplate at 120° C. for 5 minutes, allowed to cool, then immersed in the electroless plating catalyst solution. After 5 minutes of immersion, the substrate was removed and rinsed thoroughly under running deionized water. The catalyzed substrate was then immersed in the accelerator solution. After 2 minutes of immersion, the substrate was gently rinsed with deionized water. The accelerated substrate was then metallized by electroless plating using the Fifty Percent Copper Metallization Bath. Plating times were typically 2-5 minutes. Optical micrographs of the resultant metallized patterns are shown in FIGS. 5*d* and 6.

What is claimed is:

1. An article of manufacture comprising a substrate rendered catalytic according to the method comprising the steps of: (a) depositing a ligating chemical agent on said substrate, which is capable of both binding to said substrate and ligating to an electroless plating catalyst; and (b) ligating said electroless plating catalyst to said ligating chemical agent, wherein said ligating chemical agent has the chemical structure:

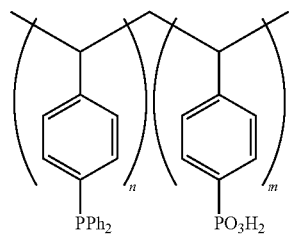

wherein n and m are each between about 1 and about 100, wherein the article has a metal coating over portions of said substrate in a selected pattern and being bonded to said substrate through an intermediate layer of catalyzed ligating chemical agent.

2. An article of manufacture comprising a substrate rendered catalytic according to the method comprising the steps of: (a) depositing a ligating chemical agent on said substrate, which is capable of both binding to said substrate and ligating to an electroless plating catalyst; and (b) ligating said electroless plating catalyst to said ligating chemical agent, wherein said ligating chemical agent has the chemical structure:

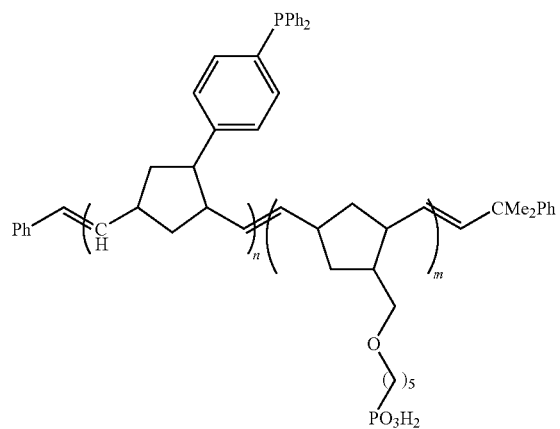

wherein n and m are each between about 1 and about 100, wherein the article has a metal coating over portions of said substrate in a selected pattern and being bonded to said substrate through an intermediate layer of catalyzed ligating chemical agent.

* * * * *